(12) United States Patent
Bonds et al.

(10) Patent No.: US 8,485,435 B2
(45) Date of Patent: *Jul. 16, 2013

(54) SYSTEM AND METHOD OF FINANCIAL INSTRUMENT PROCESSING WITH DUPLICATE ITEM DETECTION

(75) Inventors: Dale Bonds, Loudonville, NY (US);
John W. Burgess, Albany, NY (US);
Luke Tetreault, Loudonville, NY (US)

(73) Assignee: KeyCorp, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,370

(22) Filed: Aug. 14, 2012

(65) Prior Publication Data
US 2012/0314931 A1    Dec. 13, 2012

Related U.S. Application Data

(63) Continuation of application No. 12/058,216, filed on Mar. 28, 2008, now Pat. No. 8,240,554.

(51) Int. Cl.
*G07F 19/00* (2006.01)
*G07F 17/00* (2006.01)

(52) U.S. Cl.
USPC .......................................... 235/379; 235/375

(58) Field of Classification Search
USPC .................. 235/375, 379; 902/7, 28; 705/30, 705/35, 45
See application file for complete search history.

(56) References Cited

U.S. PATENT DOCUMENTS

| | | | |
|---|---|---|---|
| 7,840,455 B1 * | 11/2010 | Venkatasubramanian et al. | 705/30 |
| 8,326,761 B1 * | 12/2012 | Hecht et al. | 705/45 |
| 2008/0103790 A1 * | 5/2008 | Abernethy et al. | 705/1 |
| 2010/0098318 A1 * | 4/2010 | Anderson | 382/137 |
| 2011/0112961 A1 * | 5/2011 | Stokes et al. | 705/39 |

* cited by examiner

*Primary Examiner* — Jamara Franklin
(74) *Attorney, Agent, or Firm* — Thompson Hine L.L.P.

(57) ABSTRACT

A method and system for processing financial instruments to detect the presence of duplicate instruments. The method may include the steps of receiving items of information for a plurality of financial instruments, grouping the items into cycles and appending cycle and time dependent information to the items to form coded items, storing the coded items in a database, comparing the items to find items having duplicate identifying information, marking duplicate items for subsequent deletion and printing a report listing the duplicate items. The system may include a mainframe, data repository, item processing applications, and a module that filters items from incoming strings to remove false positives. The remaining duplicate items may be viewed on a graphical user interface that allows a user to review attributes of each item and manually mark duplicates for subsequent deletion.

14 Claims, 5 Drawing Sheets

CYCLE X  ENTRY XXXX  DUPLICATE UPDATE  CYCLE DATE MM/DD/YYYY

| SEL | SEQUENCE NO. DUPE SEQUENCE # | SERIAL CYCLE DATE | R/T CYCLE | ACCOUNT ENTRY | P/C ONUS | AMOUNT OPR |
|---|---|---|---|---|---|---|
| X | XXXXXX XXXXXX | XXXXX YYYY-MM-DD | XXXX X | XXXXXX XXXX | XXXX XXX | XXXX.XX XXX |
| X | XXXXXX XXXXXX | XXXXX YYYY-MM-DD | XXXX X | XXXX XXXX | XXX XXX | XXXXXX.XX XXX |
| X | XXXXX XXXXXX | XXXXXX YYYY-MM-DD | XXXX X | XXXXXX XXXX | XXXX XXX | XXXXXX.XX XXX |
| X | XXXXXX XXXXXX | XXXXXX YYYY-MM-DD | XXXX X | XXXXXX XXXX | XXX XXX | XXXXXX.XX XXX |

Fig. 4

SYSTEM AND METHOD OF FINANCIAL INSTRUMENT PROCESSING WITH DUPLICATE ITEM DETECTION

BACKGROUND

The present disclosure relates to methods and systems for processing electronic documents and, more particularly, to methods and systems for processing financial instruments.

Legislation such as the Check Clearing for the 21st Century Act (also known as Check 21) has made it possible for banks and other financial institutions to process financial instruments, such as checks, by transmitting images of the checks, along with pertinent information read from the checks, electronically over networks such as the Internet. This electronic processing of digitized check images and information scanned from checks has greatly reduced check clearing process time and eliminated the need to store paper checks for extended periods or to transmit the paper checks to the drawer.

Typically, a check is received at a payee bank or other institution and is scanned to create a digital image of the check and to collect information such as the payee, amount and MICR (magnetic ink character recognition) data on the check. Such MICR data may include the bank routing number, checking account number, check number and, in some cases, the amount of the check. This electronic information is transmitted from the payee bank (the bank that receives the check and makes payment on it) or other source to the drawee bank (the bank upon which the check is drawn). The transmitted check images may be stored temporarily, transmitted to the drawer of the check in a statement or upon request, or made available to the drawer online. The information accompanying the image is used to process or clear the check and debit the drawer's checking account. In other arrangements, the check information may be transmitted to an intermediary bank or other processing center, where it is forwarded to the payee bank for posting.

In addition to conventional checks, other financial instruments may be processed in this manner. For example, instruments such as rebate checks, traveler's checks, bonds and lottery prize payment checks may be processed electronically as well.

SUMMARY

The disclosed method and system preferably may be used for processing data scanned or other otherwise obtained from financial instruments. In particular, the method and system disclosed may be used to detect and eliminate data representing duplicate items from the data streams incoming to a financial institution. The disclosed method may include a step of filtering the incoming data pertaining to financial instruments to remove from evaluation data pertaining to certain types of financial instruments that otherwise would generate false positives. The remaining information may be stored, then viewed and evaluated. A printout or display of identified potential duplicate items may be generated. A further review of the items may be conducted if items have not been worked in the initial work cycle, or as a secondary check for accuracy. The final string of data representing the incoming financial instruments, with duplicates removed, is forwarded to the proper financial institution for posting to depositor accounts.

In one aspect of the disclosed method, discrete items of identifying information, each for a plurality of financial instruments, may be received, the items may be grouped into cycles and discrete cycle and time-dependent information may be appended to each grouping to form coded items. The coded items may be stored in a database, and the stored, coded items compared to each other to find items having duplicate identifying information. A report listing the items having duplicate identifying information may be displayed and printed.

In a preferred embodiment, the disclosed method may include a step of filtering the discrete items of identifying information to eliminate false positives. Also with a preferred embodiment, the filtering may include such items as lottery prize payment accounts, bank control documents, over counter checks, rebate checks, traveler checks, bonds, checks having either no serial number or a serial number comprised entirely of zeros, or checks having blanks in certain informational fields. By eliminating all of such documents from consideration, the review of the remaining identified duplicates may be greatly simplified and the time required to work through a given batch greatly reduced. Also in the preferred embodiment, the remaining duplicate items may be displayed on a graphical user interface for review and marked by a user for subsequent deletion. Further, a printed report may be generated.

The system for conducting the method may include a graphical user interface for displaying duplicate item information, a set of processes controlling the display and updating of the duplicate item information in the data repository, and a data storage for receiving financial instrument information and storing information on potential duplicates.

BRIEF DESCRIPTION OF THE DRAWINGS

FIG. 4 is a graphical user interface screen showing duplicates that have been identified together with the current item.

DETAILED DESCRIPTION

Figure 1:
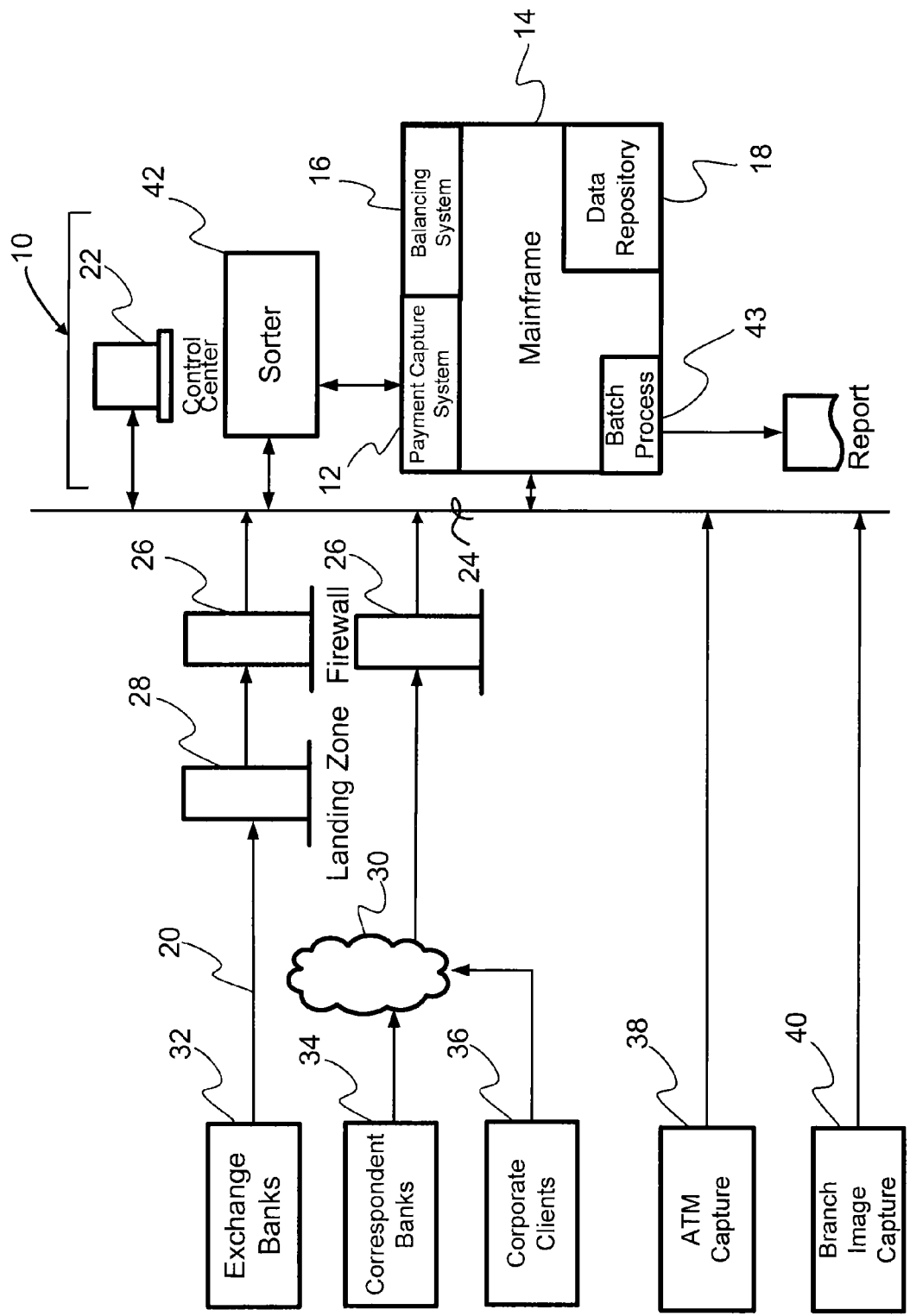
FIG. 1 is a schematic diagram of the disclosed system for processing financial instruments with duplicate item detection.

As shown in FIG. 1, a system for processing financial instruments with duplicate item detection, generally designated 10, may be incorporated into a payment capture system, generally designated 12, of a financial institution, such as a bank. The system 10 may reside on a mainframe 14 housing the payment capture system 12, which may include balancing system 16 and data repository 18. The data repository 18 may be controlled by a relational database management program such as DB2 (a product of International Business Machines, Armonk, N.Y.). A control center 22 may reflect the activity in some of the aforementioned components, which may be interconnected by a local area network (LAN) or wide area network (WAN), generally designated 24.

The system 10 may sit behind a firewall 26 and may be connected to a private network, such as SVPCO (provided by Clearinghouse Payments Company, LLC, New York, N.Y.) 20, to a private landing zone 28 or a public network such as the Internet 30. The system 10 thus may receive digital information pertaining to financial instruments, such as checks, from other banks (not shown), exchange banks 32, correspondent banks 34, corporate clients 36, automatic teller machines ("ATM's") 38 or image capture devices 40 at branches of the bank.

In addition, as part of the check processing system the bank may operate one or more sorters 42, which may be located at regional check processing centers, for scanning paper checks with sorting machines to generate digitized check images and to read and transmit digital check information, primarily from MICR lines. Such sorters 42 make the digitized check information available to be processed by the system 10. Digitized check information may be transmitted from the sorter 42 over the network 24 or to payment capture system 12 of the mainframe 14.

Figure 2:
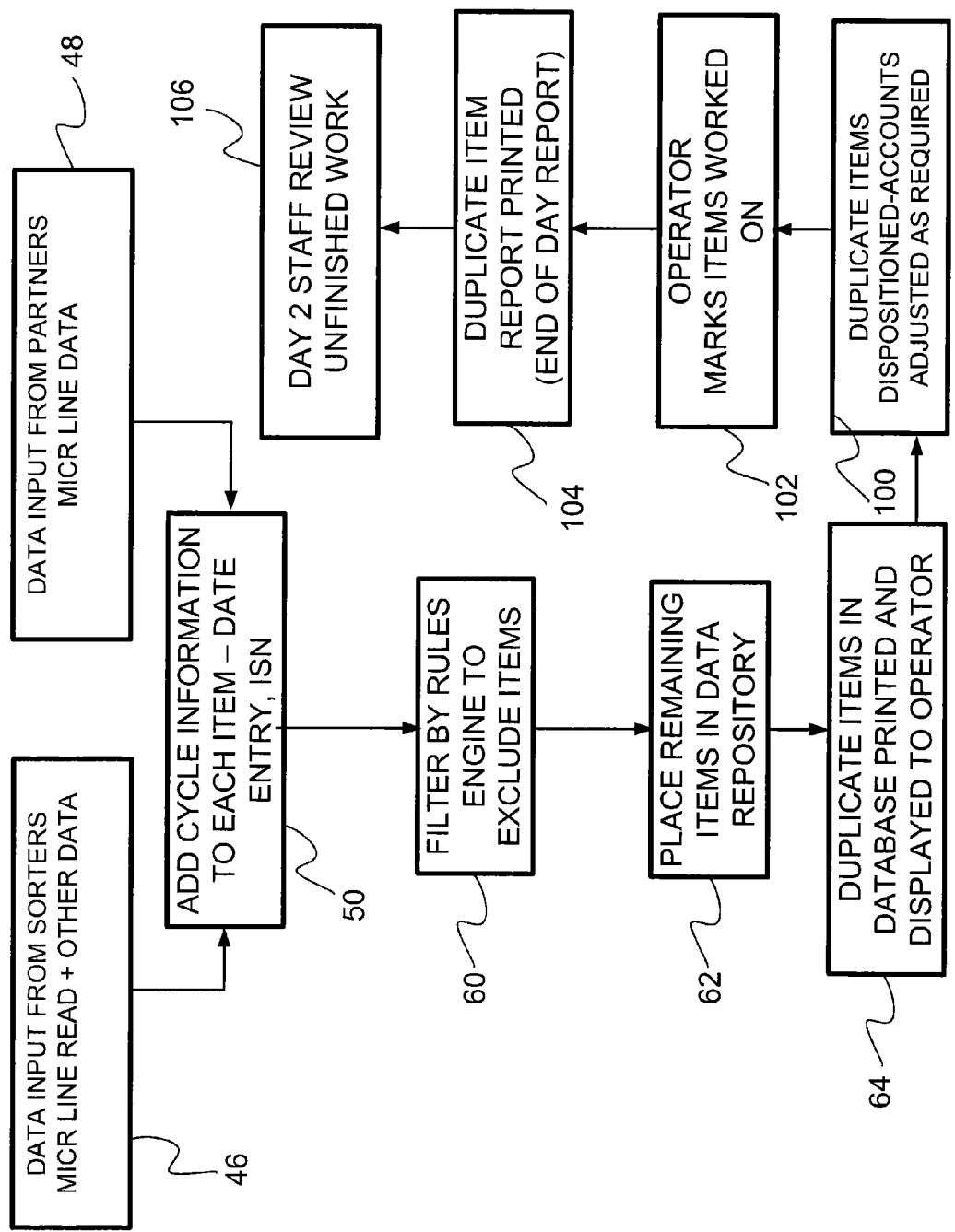
FIG. 2 is a flow chart of the method for processing financial instruments with duplicate item detection.

The process is shown in FIG. 2. As shown in block 46, data may be received in the system 10 (FIG. 1) from the sorters 42. This data may be scanned from checks and other financial instruments, primarily from the MICR line of the check or instrument. In addition, as shown in block 48, MICR line data may be received from other banks, such as exchange banks 32 and correspondent banks 34, as well as from corporate clients 36, ATM capture 38 and branch image capture 40. Such information may pass through the firewall 26 and may be transmitted over network 24 to the payment capture system 12.

The data may be received in input strings (a string of data captured from multiple items or records coming from a single source). The string may include data from every document (which may contain many items) read by the document processor (e.g., sorter 42), including control documents. Each record or item may contain related information such as the pocket (the groupings of the sorted documents), the sort pattern (the numerical name of the employed sort), user field information (codes that assist in identifying the type of record or item (e.g., a deposit or debit) and also may include internally generated control records.

Cycle information may be added to each of those records or items. Cycle information may include the date, entry and ISN (item sequence number, a number that defines the incoming sequence of a record or item within the input stream, and is associated with the record or item throughout the entire cycle of computer processing), as shown in block 50. Thus, all the records or items coming in from sorters 42, exchange banks 32, correspondent banks 34, corporate clients 36, ATM capture 38 and branch image capture 40 during a business day may be grouped into a cycle to which the time and date are appended.

As shown in FIG. 2, the incoming input strings may be filtered by a rules engine, as shown in block 50, to exclude certain documents or items from further consideration as duplicates. This filtering may take place at various points in the process including: before items are placed in the data repository, block 60; before items are reported or displayed to operators, blocks 64 and 104; and as part of the end-of-day process, shown in block 104.

Figure 5:
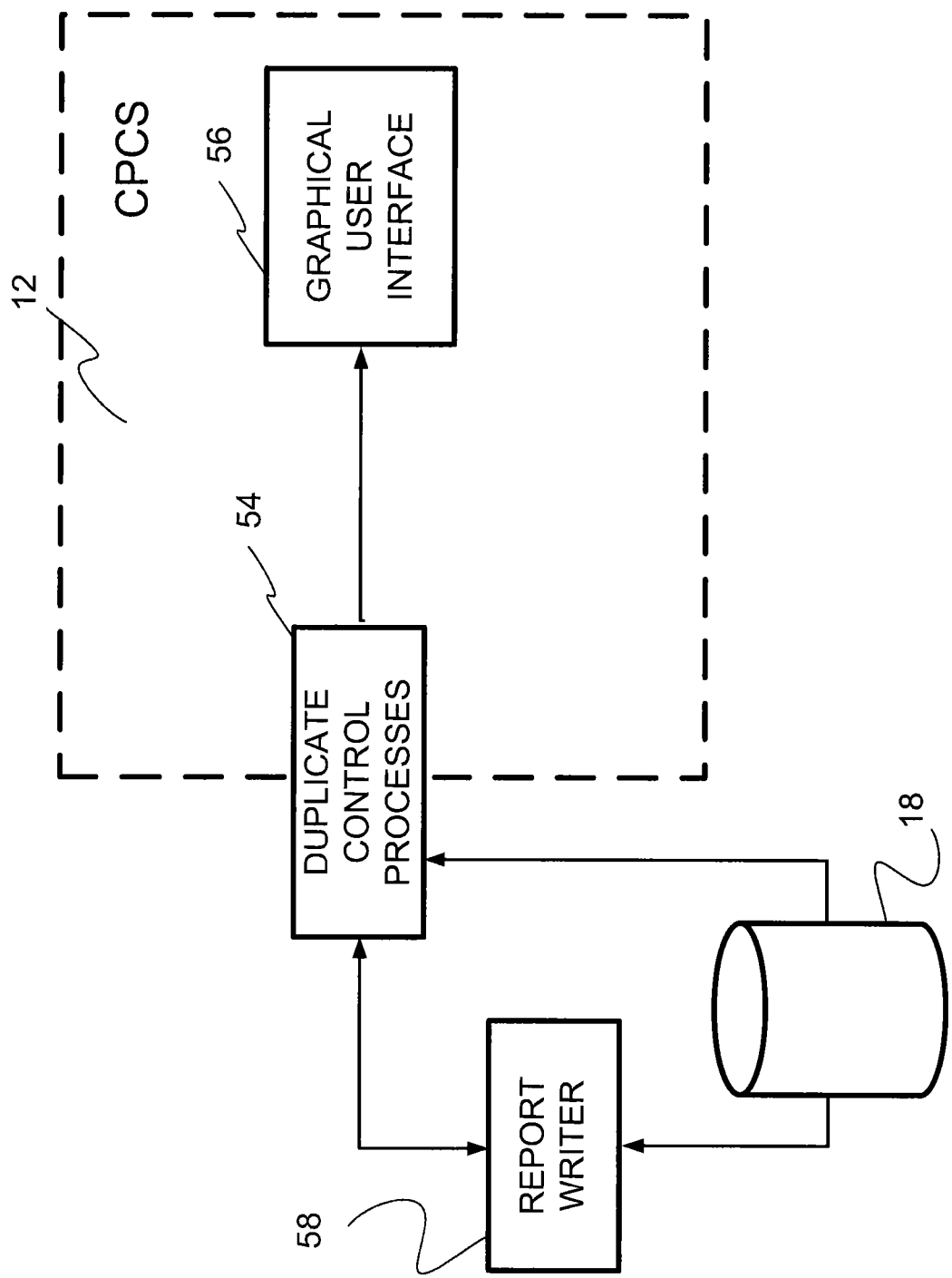
FIG. 5 is a schematic showing the payment capture system for the disclosed system and method for processing financial instruments with duplicate item detection.

As shown in FIG. 5, the payment capture system 12 may include a set of processes 54 that control a graphical user interface 56 and a report writer 58. These processes 54 may control events that occur within the capture system (the display of duplicates to the operator on a screen) and events that occur outside of capture system (report writing and updating of the data repository). These processes 54 may include a rules engine that applies the following rules, shown by way of example in Table I, to incoming input strings, displayed data and reported data.

TABLE I

| | |
|---|---|
| Account number exclusions: | 1. All 14 blanks. All bank items require account numbers, transit rejects with the strips do not have account number encoded on them.<br>2. 775970059 lottery prize payment account.<br>3. 55555555 bank control document.<br>4. 00000055555555 bank control document.<br>5. 00000775970059 lottery prize payment account.<br>6. 00000000000000 all 14 zeroes. All bank items require account numbers. |
| PC field and Serial field exclusions: | 1. 0000000000 - Serial and 000000 - PC (need a valid PC or Serial) 90% of Bank Checks have serial numbers.<br>2. 009999 - PC Over counter checks (usually written for cash/even amounts).<br>3. 7777777777 - Serial together with 777777 - PC field capture with no serial numbers are defaulting to this.<br>4. Blanks in all 3 Account, Serial and PC fields. Usually a transit reject that has been stripped.<br>5. Blanks in both Serial and PC fields. 90% of Bank checks have serial numbers in either field.<br>6. Zeroes in both Serial and PC fields. 90% of Bank checks have serial numbers in either field. |
| Amount exclusions: | 1. Under $5.00 (rebate checks). A lot of rebate checks do not have serial numbers causing these to be reported as a false positive. |
| Return item flag exclusions: | 1. Any item with a redeposit flag. Checks that did not post to account but were sent to be re-deposited to see if the funds are available now. |
| Sort pattern and User Field exclusions: | 1. 59 sort pattern. Used for returned items - all stripped items.<br>2. 58 sort pattern with user field 99. Transit adjustment on Inclearing work.<br>3. 19 sort pattern with user field greater that 90 Transit. ATMs from Albany.<br>4. 159 sort pattern with user field greater than 90 Transit. ATMs from Ohio.<br>5. 179 sort pattern with user field greater than 90 Transit. ATMs from Utah.<br>6. 223 sort pattern with user field greater than 90 Transit. ATMs from Tacoma.<br>7. 151 sort pattern with user field 90 Transit rejects. |
| Excluded user field combos: | 1. 91 user field with 64 user field. Rejects for WICs/NY State.<br>2. 92 user field with 54 user field. Transit disbursements and CDA.<br>3. 90 user field with 50 user field. Transit debit.<br>4. 90 user field with 54 user field. Transit CDA.<br>5. 90 user field with 56 user field. Transit and ECP not posted. |
| Excluded user fields: | All credits are excluded. Items that do not have serial numbers and some accounts that use same serial number twice.<br>1, 5, 6, 7, 8, 9, 0B, 0D, 0E, 0F, 10, 11, 12, 13, 14, 14, 1A, 21, 24, 25, 26, 27, 28, 29, 2F, 30, 31, 34, 35, 36, 39, 3A, 3B, 3C, 3D, 3E, 3F, 40, 41, 42, 43, 44, 45, 46, 47, 48, 49, 4A, 4B, 4E, 4F, 51, 52, 59, 5E, 60, 62, 66, 67, 69, 6B, 78, 7C, 7D, 81, 83, 84, 85, 86, 89, 8A, 8B, 8D, 4C, 4D, 5A, 5B, 5C, 5D. |
| Return Item field exclusions: | 1. 2<br>2. 5 |

The rules engine may remove from operator review "false positives"—those items that may appear to be duplicates but are legitimate and items that have insufficient information to make a determination of their duplicate status. For example, items that either do not have a MICR line or identifying account/serial number, such as a transit reject item that has been stripped (i.e., the MICR line has been covered over), do not have sufficient information to be presented for review. Other items that have the same account number on multiple items, such as lottery prize payments, are legitimate items but cannot be distinguished from each other.

In addition, certain combinations of numbers appearing in the process control (PC) field, such as the check number together with the Serial field, are also excluded. The rules engine also excludes any item under $5.00, such as rebate checks, since such items do not have a serial number and the absence of a serial number would cause such items to be reported as a false positive (i.e., a duplicate).

The next item on the rules engine exclusion may be the returned item flag exclusion, which pertains to returned items such as resubmitted checks. The rules also may pertain to certain types of routing transit numbers (R/T), such as bank cash tickets, traveler checks, bonds, Canadian rebate checks and lottery prize payment accounts.

The rules engine also may pertain to sort patterns and user field exclusions, such as items coming from ATMs from certain locations, all stripped items, and transit rejects. A particular bank may want to add additional excluded user fields, as indicated in the lower portion of Table I above. As a result, all such items are removed from review by the operator, thereby minimizing the required effort to review possible duplicates.

Figure 3:
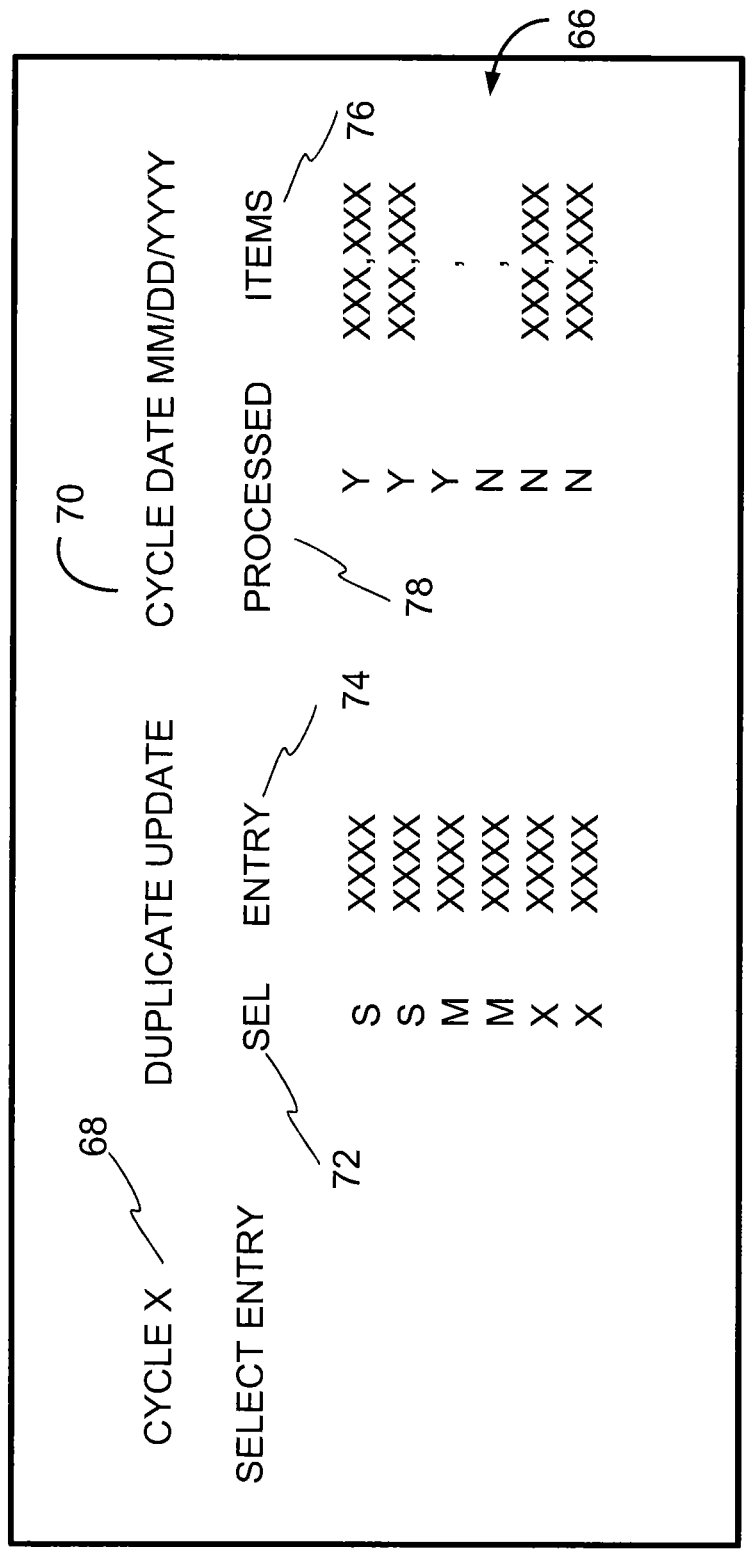
FIG. 3 is a graphical user interface screen displaying detected duplicate items as grouped into entries for further processing by a user.

As shown in block 64 (see FIG. 2), the duplicate items in the data repository 18 (see FIG. 1) may be displayed to an operator at the graphical user interface 56 (FIG. 5) as well as reported via a printed report. The processing of the displayed items may be accomplished with two screens. First, as shown in FIG. 3, a screen 66 of the graphical user interface 56 (FIG. 5) may display the cycle 68, cycle date 70, selection 72, entry 74, number of duplicate items 76 and whether such items have been processed, shown in column 78. The select ("SEL") column 72 may allow an operator to work a group of items (known as an entry) using selected ("S") or marked ("M") to indicate that such items are being or have been reviewed. Entering an "S" in column 72 may indicate that particular group of items will be displayed in the next screen (FIG. 4). Entering an "M" in column 72 may indicate that the review of that group of items is complete.

As shown in FIG. 4, screen 80 may show all of the items that have been identified, at least preliminarily, as duplicates, selected for a particular cycle 68, entry 82 and cycle date 70. The screen 80 may display the identifying information pertaining to the potentially duplicate items. This information may be displayed in pairs such that the information identifying the current item is displayed on one row and immediately beneath that row, a second row adds information about the potential duplicate. Thus, the sequence number 84, serial number 86, routing transit number 88, account number 90, process control field 92 and amount 94 may identify the current item while a unique sequence number 85, cycle date 87, cycle number 89, entry number 91, On-Us field 93 identify the potential duplicate.

With each selection 98, an operator may mark the item as having been worked on. This is referred to in FIG. 2, block 102. The adjustment of accounts, deletion of duplicate items and disposition of items identified as duplicates may be independent of this system (FIG. 2, block 100). The balancing system 16 (FIG. 1) is where items may be deleted or adjusted. As shown in FIG. 2, in block 104 an end of day (EOD) duplicate item report may be printed, showing all of the duplicate items detected for that day's work. This may be accomplished by report writer 58 (FIG. 5). As shown in block 106, any remaining potential duplicates may be reviewed and dispositioned at a later date using the EOD report.

After reviewing the listed duplicates (FIG. 4), an operator may minimize the window and access a different system to verify that the item in question already has been paid, or the item returned. If necessary, corrections may be made to the suspected duplicate, such as adding or changing information in the record. The operator may use the balancing system 16 (FIG. 1) to delete a suspected duplicate that proves not to be a duplicate. An end-of-day update may be made to delete suspected duplicates, and the updated information is stored in the data repository 18. Each week, the oldest week's volume of reviewed items in data repository 18 may be purged.

As can be seen from the foregoing description, the disclosed method and system provides efficient means for reviewing input strings of financial instruments to eliminate potential duplicate entries. The system may include a rules engine that excludes items that might otherwise generate false positives and therefore greatly reduces the number of items that might otherwise need review by a human operator.

What is claimed is:

1. A system for processing financial instruments in order to detect the presence of duplicate instruments, the system comprising:
a processor having a component configured to receive from a scanning device a data stream in input strings representing information scanned from a plurality of financial instruments;
said processor including a rules engine configured to filter each of said input strings by applying rules to said input strings to exclude data representing financial instruments having no scanned data, and if scanned data exists, that meet at least one of said rules, thereby eliminating from further treatment false positives within each of said input strings; and
a user interface for displaying data from said filtered input strings representing duplicate financial instruments.

2. The system of claim 1 wherein said user interface allows said displayed data representing duplicate financial instruments to be viewed and marked for deletion from said input string by an operator.

3. The system of claim 1 wherein said processor appends unique cycle information to each input string.

4. The system of claim 3 wherein said processor filters data having common cycle information.

5. The system of claim 4 wherein said appended cycle information includes one or more of a date, entry and item sequence number.

6. The system of claim 5 wherein said processor filters said data by removing from consideration as duplicates financial instruments having at least one of the following characteristics: blanks instead of account numbers, one of a predetermined group of account numbers, none or one of a predetermined group of process control field and serial field numbers, an amount less than a predetermined value, a redeposit flag, one of a predetermined group of sort pattern and user field numbers, one of a predetermined group of user field number combinations, one of a predetermined group of user field numbers, one of a predetermined group of returned item field exclusions, and financial instruments coming from an ATM.

7. The system of claim 1 further comprising a scanning device for scanning information from a financial instrument and generating a data stream of said scanned information in input strings, said scanning device communicating with said processor over a network.

8. The system of claim 1 wherein said processor is configured to receive said data stream from a sorter.

9. The system of claim 1 wherein said processor includes a balancing system for deleting one of said financial instruments that proves not to be one of said duplicate financial instruments.

10. The system of claim 1 further comprising a data repository for storing said duplicate financial instruments.

11. The system of claim 1 wherein said user interface is configured to allow an operator to mark ones of said financial instruments of said data from said filtered input strings representing duplicate financial instruments as having been worked on.

12. The system of claim 1 wherein said rules engine is configured to remove said false positives from operator view at said user interface.

13. The system of claim 1 wherein said processor resides on a mainframe.

14. A system for processing financial instruments in order to detect the presence of duplicate instruments comprising:
- a processor configured to receive from a scanning device a data stream in input strings representing information scanned from each of a plurality of financial instruments;
- said processor appending unique cycle information to each input string, said cycle information including one or more of a date, entry and item sequence number;
- said processor including a rules engine for filtering data having common cycle information on each of said input strings that applies rules to incoming input strings to exclude data representing financial instruments that meets at least one of said rules, thereby eliminating from further treatment false positives;
- said rules engine filtering said input strings by removing from consideration as duplicates financial instruments having at least one of the following characteristics: blanks instead of account numbers, one of a predetermined group of account numbers, none or one of a predetermined group of process control field and serial field numbers, an amount less than a predetermined value, a redeposit flag, one of a predetermined group of sort pattern and user field numbers, one of a predetermined group of user field number combinations, one of a predetermined group of user field numbers, one of a predetermined group of returned item field exclusions, and financial instruments coming from an ATM;
- a graphical user interface for displaying data from said filtered input strings representing duplicate financial instruments displaying said data on a graphical user interface; and
- said graphical user interface displaying data to an operator and enabling an operator to mark for deletion from said input string data representing said duplicate financial instruments.

* * * * *